United States Patent Office 2,978,505
Patented Apr. 4, 1961

2,978,505

POLYNITRO NITRAZA DIAMINES

Milton B. Frankel, Pasadena, and Karl Klager, Monrovia, Calif., assignors to Aerojet-General Corporation, Azusa, Calif., a corporation of Ohio No Drawing. Filed Apr. 13, 1956, Ser. No. 578,151

16 Claims. (Cl. 260—583)

This invention relates to new compositions of matter useful as high explosives and a method for their preparation. In particular, this invention relates to polynitro nitraza diamines having the general formula:

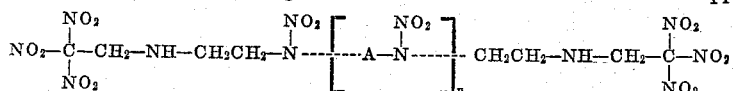

wherein A is an alkylene radical and $n$ is a small whole number from 0 to 1 inclusive.

This application is a continuation-in-part of our copending United States patent application Serial No. 416,699, filed March 16, 1954, now abandoned.

The compounds of this invention are prepared by condensing 2,2,2-trinitroethanol with a nitraza diamine, in accordance with the general reaction scheme set forth below:

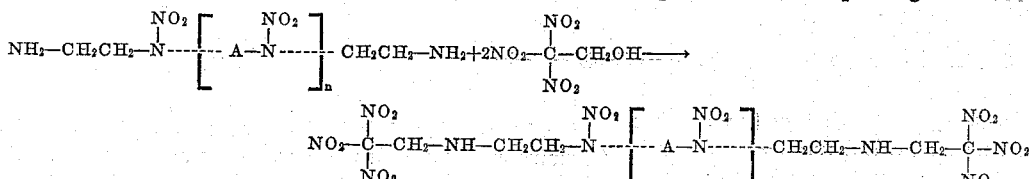

wherein A and $n$ are as defined above.

Due to the degration of trinitromethyl groups by strong alkalis, it is preferred to conduct the condensation at a pH in the range of from about 4 to about 8. As the nitraza diamines are somewhat unstable free bases, we prefer to introduce the diamines into the reaction mixture as salts. Optimum results were obtained using a readily hydrolyzable organic salt. Another equally suitable method is to generate the diamine from a mineral acid salt in situ with a hydroxide or lower alkanoic acid salt of an alkali or alkaline earth metal.

The nitraza diamines used as starting materials in this invention are prepared by reacting a strong mineral acid with a nitramino isocyanate obtained by reacting an acid halide with sodium azide. The acid halides are obtained by condensing acrylonitrile with ammonia or a diamine, as disclosed in Organic Reactions, vol. V, page 79, and subsequently reacting the condensation product with nitric acid, hydrolyzing the product and then reacting it with thionyl halide.

To more fully illustrate this invention, the following examples are presented. It is to be understood, however, that these examples are presented merely as a means of illustration and are not intended to limit the scope of the invention in any way.

EXAMPLE I

Preparation of 1,1,1,6,9,14,14,14-Octanitro-3,6,9,12-tetraza-tetradecane

In a flask fitted with a mechanical stirrer, thermometer and dropping funnel was placed a solution of 69.5 gm. (0.38 mole) of 2,2,2-trinitroethanol and 250 ml. of water, and a solution of 47.0 gm. (0.19 mole) of 3,6-dinitraza-1,8-octane diamine dihydrochloride in 250 ml. of water. A solution of 15.3 gm. (0.38 mole) of sodium hydroxide and 100 ml. of water was added dropwise over a period of 25 minutes. A bright yellow solid precipitated which after drying under vacuum exhibited a M.P. of 100–105° C., with decomposition.

EXAMPLE II

Preparation of 1,1,1,6,11,11,11-Heptanitro-3,6,9-Triaza-undecane

In a flask fitted with a mechanical stirrer, thermometer and dropping funnel was placed 22.1 gm. (0.1 mole) of 3-nitraza-1,5-pentane diamine dihydrochloride, 36.2 gm. (0.2 mole) of 2,2,2-trinitroethanol and 75 ml. of water. A solution of 8 gm. (0.2 mole) of soduim hydroxide and 50 ml. of water was added at room temperature. A yellow gummy solid precipitated.

We have also found that nitraza diamines such as 3,5-dinitraza-1,7-heptane diamine and 3,8-dinitraza-1,10-decane diamine readily condense with 2,2,2-trinitroethanol to produce the corresponding nitraza secondary diamines, namely; 1,1,1,6,8,13,13,13-octanitro-3,6,8,11-tetrazo-tridecane and 1,1,1,6,11,16,16,16-octanitro-3,6,11,14-tetraza-hexadecane.

It is apparent that any member of this series of polynitro nitraza diamines may be prepared by merely selecting the appropriate nitraza diamine and condensing it with 2,2,2,-trinitroethanol, in accordance with the teachings of this invention.

The compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

We claim:

1. As compositions of matter, the polynitro nitraza diamines having the general formula:

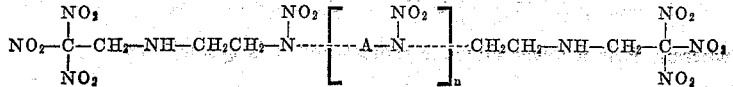

wherein A is a lower alkylene radical and $n$ is a small whole number from 0 to 1 inclusive.

2. As a composition of matter, 1,1,1,6,9,14,14,14-octanitro-3,6,9,12-tetraza-tetradecane having the structural formula:

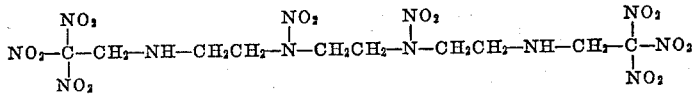

3. As a composition of matter, 1,1,1,6,11,11,11-heptanitro-3,6,9-triaza-undecane having the structural formula:

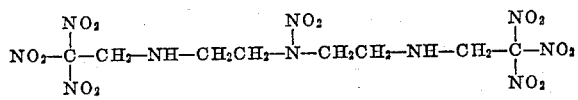

4. As a composition of matter, 1,1,1,6,8,13,13,13-octanitro-3,6,8,11-tetraza-tridecane having the structural formula:

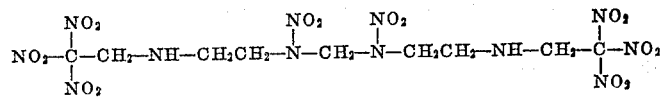

5. As a composition of matter, 1,1,1,6,11,16,16,16-octanitro-3,6,11,14-tetraza-hexadecane having the structural formula:

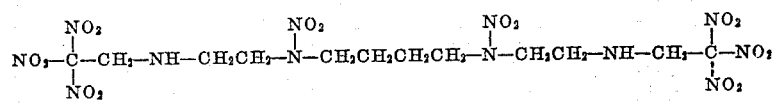

6. The method of preparing polynitro nitraza diamines having the general formula:

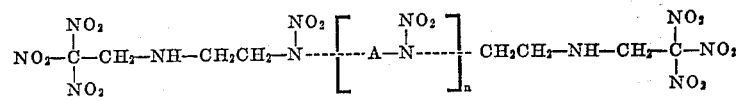

which comprises condensing 2,2,2-trinitroethanol with a nitraza diamine having the general formula:

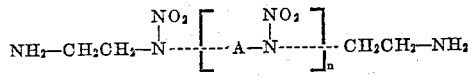

wherein A is a lower alkylene radical and $n$ is a small whole number from 0 to 1 inclusive.

7. The method of preparing polynitro nitraza diamines having the general formula:

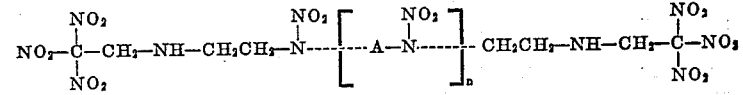

which comprises condensing 2,2,2-trinitroethanol with a nitraza diamine having the general formula:

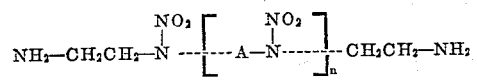

wherein A is a lower alkylene radical and $n$ is a small whole number from 0 to 1 inclusive; at a pH of from about 4 to about 8.

8. The method of preparing polynitro nitraza diamines having the general formula:

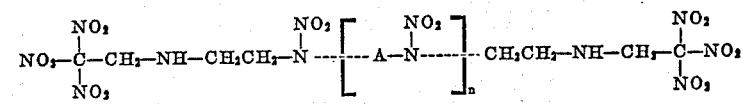

which comprises condensing 2,2,2-trinitroethanol with a nitraza diamine having the general formula:

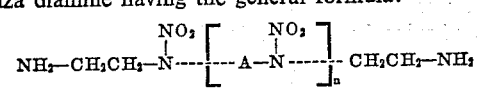

wherein A is a lower alkylene radical and $n$ is a small whole number from 0 to 1 inclusive, said nitraza diamine being generated in the reaction mixture from its mineral acid salt by introducing a base selected from the group consisting of the hydroxides of alkali and alkaline earth metals.

9. The method of preparing 1,1,1,6,9,14,14,14-octanitro-3,6,9,12-tetraza-tetradecane which comprises condensing 3,6-dinitraza-1,8-octane diamine with 2,2,2-trinitroethanol.

10. The method of preparing 1,1,1,6,9,14,14,14-octanitro-3,6,9,12-tetraza-tetradecane which comprises condensing 2,2,2-trinitroethanol with 3,6-dinitraza-1,8-octane diamine at a pH of from about 4 to about 8.

11. The method of preparing 1,1,1,6,9,14,14,14-octanitro-3,6,9,12-tetraza-tetradecane which comprises condensing 2,2,2-trinitroethanol with 3,6-dinitraza-1,8-octane diamine dihydrochloride in the presence of sodium hydroxide.

12. The method of preparing 1,1,1,6,11,11,11-heptanitro-3,6,9-triaza-undecane which comprises condensing 3-nitraza-1,5-pentane diamine with 2,2,2-trinitroethanol.

13. The method of preparing 1,1,1,6,11,11,11-heptanitro-3,6,9-triaza-undecane which comprises condensing 2,2,2-trinitroethanol with 3-nitraza-1,5-pentane diamine at a pH of from about 4 to about 8.

14. The method of preparing 1,1,1,6,11,11,11-heptanitro-3,6,9-triaza-undecane which comprises condensing 2,2,2-trinitroethanol with 3-nitraza-1,5-pentane diamine dihydrochloride in the presence of sodium hydroxide.

15. The method of preparing 1,1,1,6,8,13,13,13-octanitro-3,6,8,11-tetraza-tridecane which comprises condensing 2,2,2-trinitroethanol with 3,5-dinitraza-1,7-heptane diamine.

16. The method of preparing 1,1,1,6,11,16,16,16-octanitro-3,6,11,14-tetraza-hexadecane which comprises condensing 2,2,2-trinitroethanol with 3,8-dinitraza-1,10-decane diamine.

No references cited.